United States Patent [19]

Yan

[11] Patent Number: 5,182,921

[45] Date of Patent: Feb. 2, 1993

[54] SOLAR DEHUMIDIFIER

[75] Inventor: Wen-Jyh Yan, Hsinchu, Taiwan

[73] Assignee: Industrial Technology Research Institute, Taiwan

[21] Appl. No.: 866,348

[22] Filed: Apr. 10, 1992

[51] Int. Cl.⁵ .................... F25B 15/00; F25D 23/00
[52] U.S. Cl. .................................... 62/235.1; 62/271;
55/32; 261/157; 261/161; 261/127; 261/138;
261/141
[58] Field of Search .............. 62/235.1, 271; 55/32;
261/157, 161, 127, 138, 141

[56] References Cited

U.S. PATENT DOCUMENTS 4,955,205  9/1990  Wilkinson ............................... 55/32

FOREIGN PATENT DOCUMENTS 718672  2/1980  U.S.S.R. ............................ 62/235.1

Primary Examiner—Albert W. Davis, Jr.
Attorney, Agent, or Firm—Marks & Murase

[57] ABSTRACT

A solar dehumidifier which utilizes solar energy to evaporate the moisture in air absorbed by the liquid desiccant and then to make said liquid desiccant denser for reuse. In other words, the humid air is dried in order to be used in a specific area. In particular, the solar dehumidifier according to the present invention is provided with a heat-pipe heat exchanger to increase the evaporation rate of the moisture absorbed by the liquid desiccant.

5 Claims, 4 Drawing Sheets

SOLAR DEHUMIDIFIER

FIELD OF THE INVENTION

The present invention relates to a solar dehumidifier, especially to a small solar dehumidifier with high efficiency.

BACKGROUND OF THE INVENTION

In a humid and hot area, one-third of the cooling load of an air-conditioner is caused by the latent heat (heat which brings about a change of state with no change in temperature is called latent heat). In an area with sufficient solar radiation, one can design an air-conditioning system by utilizing the inexhaustible solar energy to solve the problems of high humidity and to save the electric power consumption.

Some conventional dehumidifiers do not utilize the solar energy to remove the moisture from humid air. Although some of them take advantage of the solar energy to evaporate the moisture absorbed by the liquid desiccant, they are generally too large and expensive. This is because they must be made large in size in order to attain more solar energy. So the conventional solar liquid desiccant systems are not popular in residential applications.

Therefore, the conventional dehumidifiers still have some drawbacks. The rate of condensation of the conventional dehumidifiers is lower, hence the air-conditioning system still consumes a large amount of electricity and is not economical.

SUMMARY OF THE INVENTION

The major object of the present invention is to provide a smaller solar dehumidifier.

Another object of the present invention is to provide a solar dehumidifier with high efficiency.

A further object of the present invention is to provide a solar dehumidifier with a shading effect on a house.

The present invention is characterized in that the present invention utilizes the solar energy to evaporate the moisture in air absorbed by the liquid desiccant and then said liquid desiccant is made stronger by solar radiation for reuse. In other words, the humid air is dried in order to be used in a specific area.

The present invention comprises: a regenerator which contains liquid desiccant, wherein said regenerator further comprises a first air inlet and a first air outlet, therein moisture in said liquid desiccant being evaporated by solar radiation is removed by the air flow entering said first air inlet and leaving from said first air outlet; a dehumidifying bed unit which further comprises a second air inlet and a second air outlet, wherein said dehumidifier utilizes said regenerated liquid desiccant to absorb moisture in the air entering said second air inlet and exiting from said second air outlet ,and then circulates said liquid desiccant between said regenerator and said dehumidifying bed unit; a heat exchanger connected between said regenerator and said dehumidifying bed unit in order to perform heat exchange between the liquid desiccant flowing from said dehumidifying bed unit and the liquid desiccant returning from said regenerator.

To achieve a high rate of evaporation of the liquid desiccant in said regenerator, said regenerator is provided with a heat-pipe heat exchanger disposed between the first air inlet and the first air outlet.

BRIEF DESCRIPTION OF THE FIGURES

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENT

Figure 1:
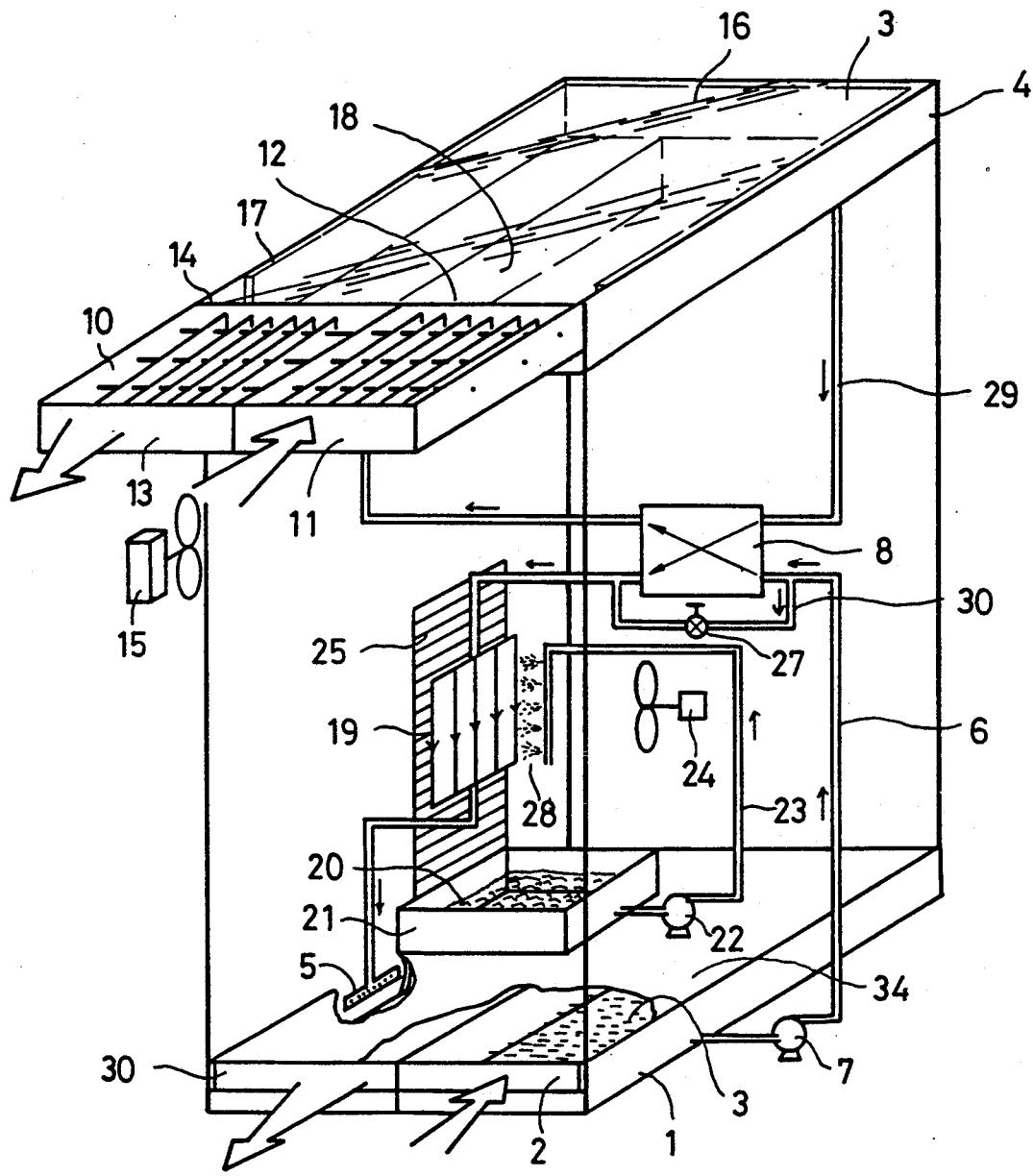
FIG. 1 is a schematic diagram showing the solar dehumidifier of the present invention.

With reference to FIG. 1 the solar dehumidifier comprises: a dehumidifying bed unit 1, a regenerator 4, a heat exchanger 8. The solar dehumidifier supplies dry air for the air-conditioning system by delivering dilute liquid desiccant due to the moisture in the air to the regenerator to concentrate said liquid desiccant for reuse in the dehumidifying bed unit.

For detailed description, the solar dehumidifier comprises:

a regenerator 4 which contains liquid desiccant 3, wherein said regenerator further comprises a first air inlet 11 and a first air outlet 13, moisture in said liquid desiccant 3 being evaporated by solar radiation will be removed by the air flow entering said first air inlet 11 and leaving from said first air outlet 13;

a dehumidifying bed unit 1 which further comprises a second air inlet 2 and a second air outlet 30, wherein said dehumidifier utilizes said regenerated liquid desiccant to absorb the moisture in the air entering said second air inlet 2 and leaving from said second air outlet 30 and then circulates said liquid desiccant between said regenerator and said dehumidifying bed unit; and a heat exchanger 8 (for example, liquid/liquid heat exchanger) connected between said regenerator 4 and said dehumidifying bed unit 1 in order to perform heat exchange between the liquid desiccant 3 flowing from said dehumidifying bed unit 1 and the liquid desiccant 3 returning from said regenerator 4.

In addition to removing the moisture in the liquid desiccant by using the solar radiation, the most important feature of this present invention lies in the fact that the regenerator is provided with a heat-pipe heat exchanger 10 which enhances the rate of concentration of the liquid desiccant in the regenerator 4.

Moreover, a plurality of pipes 19 are provided between said heat exchanger 8 and said dehumidifying bed unit 1. The pipes are used for dissipating once more the heat in the liquid desiccant returning from said heat exchanger 8. Furthermore, the pipes are provided with a water-sprinkling device on one side of the pipes. The water-sprinkling device 28 is used to splash water onto said pipes 19 for cooling said liquid desiccant in said pipes 19.

Figure 3:
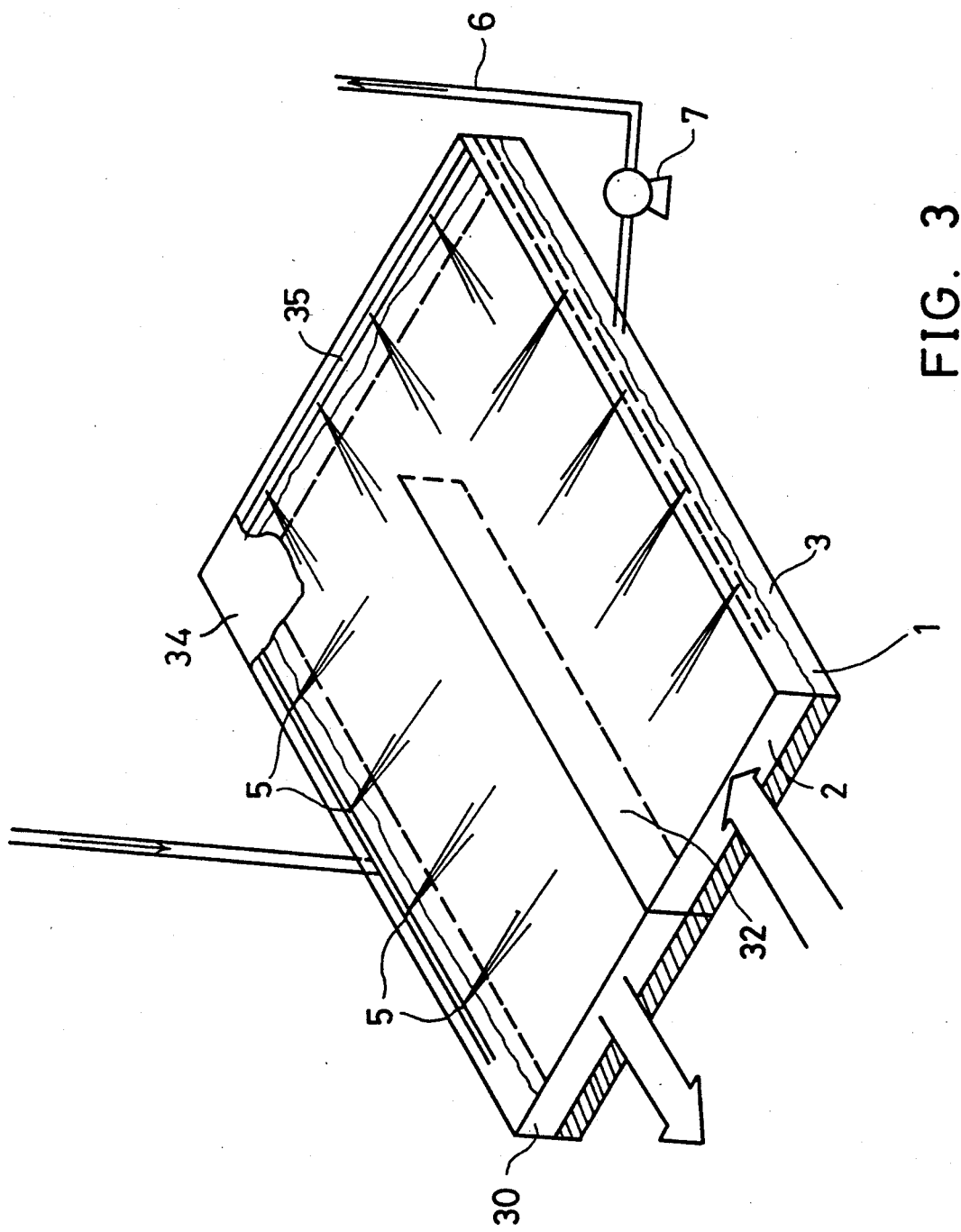
FIG. 3 is a schematic view of the dehumidifying bed unit of the present invention.

The dehumidification principle of this present invention is as follows. With reference to FIG. 3, said dehumidifying bed unit 1 is divided by a baffle 32 and thus two compartments are formed with a passage left between said two compartments for outdoor air. Said dehumidifying bed unit 1 is provided with a cover 34. Furthermore, said dehumidifying bed unit 1 is provided a surrounding pipes 35 shown in FIG. 3, on the inner wall of said dehumidifying bed unit to disperse liquid desiccant 3. Referring back to FIG. 1, as indoor humid air comes into contact with said liquid desiccant (for example, lithium chloride, lithium bromide or calcium chloride) contained in said dehumidifying bed unit 1 coated with an insulating material inside, the moisture will be absorbed by a strong liquid desiccant (for example, lithium chloride or triethylene glycol) due to the vapor pressure difference at the surface of a pool of liquid desiccant. This is one of the dehumidifying processes. The other one is the process wherein the moisture after absorbed once by strong liquid desiccant will be absorbed once more by liquid desiccant 3 returning from said regenerator 4 at a plurality of nozzles 5. The latter process is able to increase the dehumidification capacity of said liquid desiccant by increasing the contact area between said liquid desiccant and the humid air. After being dehumidified, the previously humid air will be relatively dry and then can be used by a air-conditioning system. Consequently, the latent heat load of the air-conditioning system will be lowered. In other words, the efficiency of the air-conditioning system will be increased.

Because the liquid desiccant will be dilute after absorbing moisture, it need concentrating by said regenerator 4 to remove the moisture (i.e., to make said liquid desiccant stronger).

This purpose can be achieved by the following processes. During the daylight, the dilute liquid desiccant or nearly saturated liquid desiccant is pumped by a first pump 7 through a first pipe 6 of PVC to the liquid/liquid heat exchanger 8 wherein the heat exchange takes place between said dilute liquid desiccant of lower temperature and strong liquid desiccant of high temperature returning from said regenerator 4 through a second pipe 29. In this way, the temperature of the weak liquid desiccant about to enter said regenerator 4 is raised and that of the strong liquid desiccant about to enter said dehumidifying bed unit 1 is lowered whereby the higher rate of concentration and condensation capacity of this present invention can be reached. Subsequently, the moisture absorbed by the liquid desiccant is gradually evaporated by solar radiation. Thus, the concentration of said liquid desiccant becomes higher comparatively.

Figure 2:
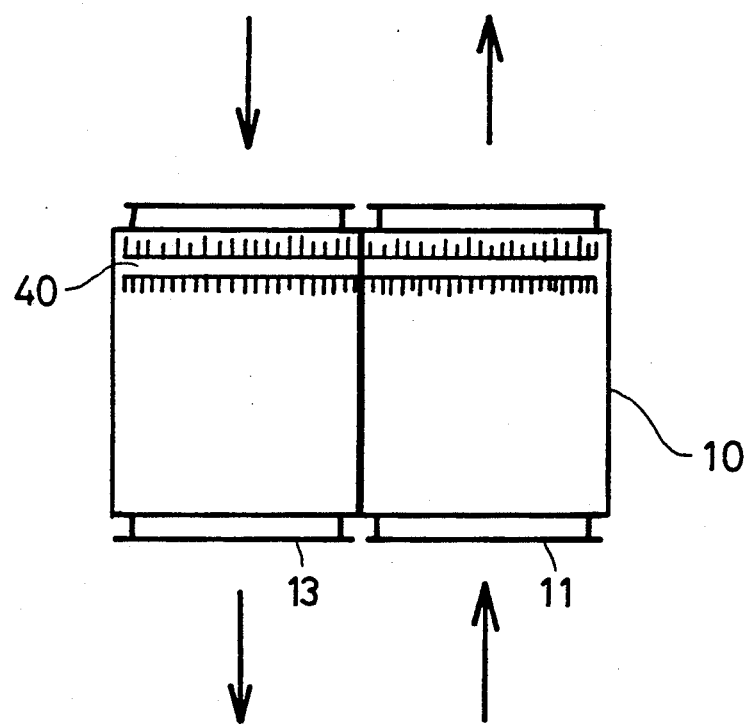
FIG. 2 is a schematic diagram of the heat-pipe heat exchanger of the present invention.
Figure 4:
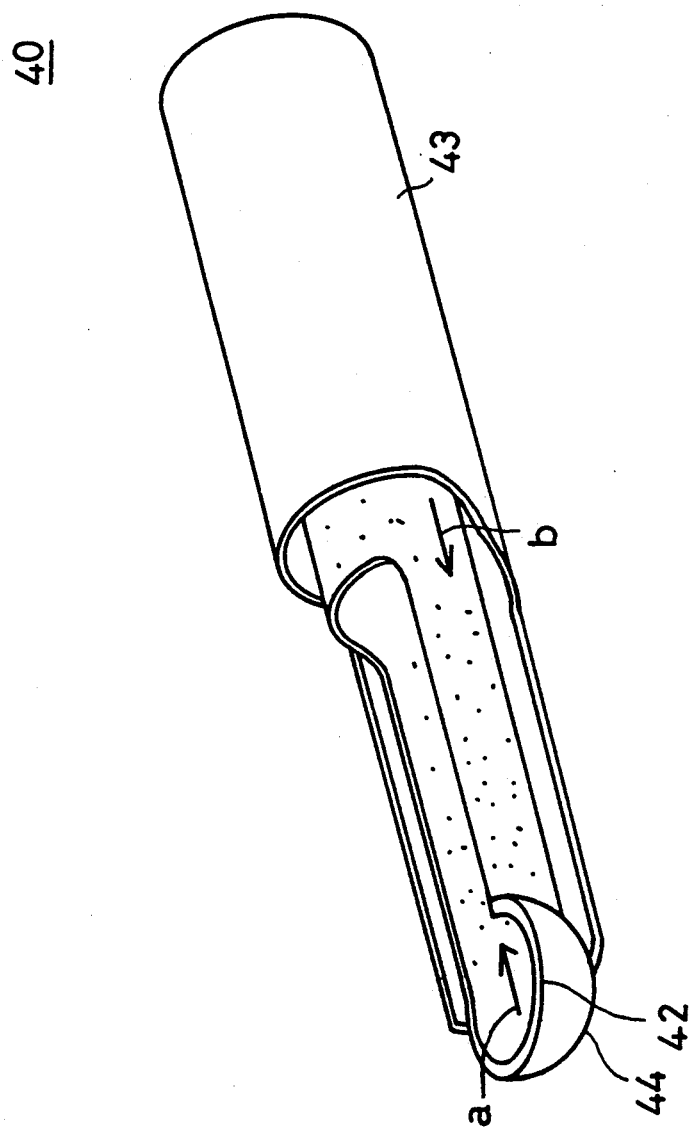
FIG. 4 is a schematic diagram of heat pipe of the heat exchanger shown in FIG. 2.

On the other hand, to increase the regeneration effect, this present invention is provided with a heat-pipe heat exchanger 10 (shown as FIG. 2). The principle of the heat-pipe heat exchanger is as follows. The heat-pipe heat exchanger 10 is provided with a plurality of pipes 40 in which a vacuum is created and then adequate working fluid is supplied as shown in FIG. 4. Consequently, the working fluid becomes saturated. The pipes 40 are closed hermetically. The working fluid is kept in the evaporation end 42 of the pipe 40. As said working fluid at the evaporation end undergoes being heated, the vapor of the working fluid will flow to the condensation end 43 at lower pressure end ( as shown by arrow a) and then condenses. The working fluid after condensation can be delivered back through the capillary structure of the inner tube 44 (as shown by arrow b). Said heat-pipe heat exchanger 10 circulates the working fluid between the evaporation end 42 and the condensation end 43 in order to carry heat absorbed said working fluid to the condensation end 43. In this manner, the heat-pipe heat exchanger 10 achieves higher heat exchange capacity than the common ones.

Thus, the heat-pipe heat exchanger can be referred to as a superconductor of heat transfer.

The heat-pipe heat exchanger 10 is affixed to the regenerator 4, wherein the inlet 11 of said heat-pipe heat exchanger 10 communicates with the first air inlet 12 of said regenerator 4 and the outlet 13 of said heat-pipe heat exchanger 10 communicates with the first air outlet 14. Meanwhile, said regenerator 4 is provided with a transparent cover 16 to prevent the hot water vapor from escaping upwardly and the inner wall of said regenerator 4 is coated with a black water-proof insulating material 17. Said regenerator 4 is divided by a baffle 18 equally with a passage therein. As outdoor air is forced into said regenerator 4 through said inlet 11 and said first air inlet 12, said outdoor air will carry said water vapor to said outlet 13 of said heat-pipe heat exchanger 10. At said heat-pipe heat exchanger 10, the hot water vapor carried out and the cool water vapor forced in undergo heat exchange to greatly increase the heat of air forced in so as to increase the rate of evaporation of the originally weak liquid desiccant.

As a result, said weak liquid desiccant becomes stronger due to not only solar irradiance but also said heat-pipe heat exchanger 8.

As the strong liquid desiccant generated by the generator 4 flows to the heat exchanger 8 through a second pipe 29, there is a heat exchange between the strong liquid desiccant of higher temperature and the weak liquid desiccant of lower temperature which constitutes the first stage of decreasing the temperature of the strong liquid desiccant. Subsequently, the strong liquid desiccant flows into a plurality of stainless-steel pipes 19. After the stainless-steel pipes are cooled by water, the strong liquid desiccant of higher temperature inside the stainless-steel pipe 19 is lowered again which constituting the second stage.

The circulation of the cooling water 20 is as follows. A container 21 of the cooling water 20 is disposed under the plurality of pipes 19. The cooling water 20 will be pumped to one side of the plurality of pipes 19 by a second pump 22. The cooling water 20 from a water-sprinkling device 28 is splashed by a fan 24 onto the plurality of pipes 19. On other side of the pipes 19, a guide baffle 25 is provided for guiding the cooling water 20 to the container 21.

After the temperature of the strong liquid desiccant is decreased twice, the strong liquid desiccant flows into the dehumidifying bed 1. To increase dehumidification effect, the dehumidifying bed 1 utilizes a plurality of nozzles 5 which are used to increase the contact area between the strong liquid desiccant and the humid air.

When it is dark or the solar irradiance is insufficient, the control valve 27 parallel to the heat exchanger 8 can be opened to allow the flow of the liquid desiccant through a by-pass pipe 30 instead of the heat exchanger 8.

Summing up the above, the solar dehumidifier can reduce the latent heat load of the air-conditioning system by increasing the contact area between the liquid desiccant and the humid air. As a result, electric power is saved. Meanwhile, the regenerating effect of the regenerator is enhanced by the heat-pipe heat exchanger, because the temperature inside the regenerator is increased by the hotter air flow coming from the heat-pipe heat exchanger. Therefore, there is no need to increase the size of the regenerator for a higher regenerating effect on the liquid desiccant or a higher rate of condensation. Consequently, the cost is lowered. In other words, the solar dehumidifier can be promoted in residential buildings. Moreover, the present invention is provided with a liquid/liquid heat exchanger and a plurality of pipes. Thus, there is no need to use a cooling water tower. Additionally, the solar dehumidifier can cool a house if it is disposed on the roof of the house.

While the invention has been described by way of example and in terms of several preferred embodiments, it is to be understand that the invention need not to be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claim is:

1. A solar dehumidifier which comprises:
   (a) a regenerator which contains liquid desiccant, wherein said regenerator further comprises a first air inlet, a first air outlet, therein moisture in said liquid desiccant being evaporated by solar radiation will be removed by the air flow entering said first air inlet and exiting from said first air outlet, and a heat-pipe heat exchanger disposed between said first air inlet and first air outlet for achieving higher rate of evaporation of said liquid desiccant;
   (b) a dehumidifying bed unit which further comprises a second air inlet and a second air outlet, wherein said solar dehumidifier utilizes said regenerated liquid desiccant to absorb moisture in the humid air entering said second air inlet and exiting from said second air outlet and then circulate said liquid desiccant between said regenerator and said dehumidifying bed unit; and
   (c) a heat exchanger connected between said regenerator and said dehumidifying bed unit in order to perform heat exchange between the liquid desiccant flowing from said dehumidifying bed unit and the liquid desiccant returning from said regenerator.

2. A solar dehumidifier as claimed in claim 1, wherein said heat-pipe heat exchanger further comprises a plurality of pipes wherein a working fluid circulates to increase the heat transfer capacity of said pipes.

3. A solar dehumidifier as claimed in claim 1, wherein a plurality of pipes are provided between said heat exchanger and said dehumidifying bed to cool said liquid desiccant flowing from said heat exchanger.

4. A solar dehumidifier as claimed in claim 3, wherein a cooling-water splashing device is provided beside said pipes between said heat exchanger and said dehumidifying bed to splash the cooling water onto said pipes for a rapid cooling effect.

5. A solar dehumidifier as claimed in claim 1, wherein a fan is provided to force air into said regenerator to carry the water vapor out of said regenerator.

* * * * *